(12) United States Patent
Yamashita

(10) Patent No.: US 12,425,751 B2
(45) Date of Patent: Sep. 23, 2025

(54) IMAGE PICKUP APPARATUS IN WHICH GLOBAL SHUTTER DRIVING OF IMAGE PICKUP DEVICE IS PERFORMED

(71) Applicant: CANON KABUSHIKI KAISHA, Tokyo (JP)

(72) Inventor: Yusuke Yamashita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 18/432,994

(22) Filed: Feb. 5, 2024

(65) Prior Publication Data
US 2024/0267645 A1 Aug. 8, 2024

(30) Foreign Application Priority Data
Feb. 8, 2023 (JP) .................................. 2023-017355

(51) Int. Cl.
*H04N 25/532* (2023.01)
*H04N 25/62* (2023.01)
*H04N 25/76* (2023.01)
*H04N 25/771* (2023.01)

(52) U.S. Cl.
CPC .......... *H04N 25/532* (2023.01); *H04N 25/62* (2023.01); *H04N 25/771* (2023.01); *H04N 25/7795* (2023.01)

(58) Field of Classification Search
CPC .... H04N 25/532; H04N 25/62; H04N 25/771; H04N 25/7795; H04N 25/59; H04N 23/88; H04N 23/741; H04N 25/57; H04N 25/42
USPC ........................................................ 348/296
See application file for complete search history.

(56) References Cited

U.S. PATENT DOCUMENTS

| 2009/0086074 A1* | 4/2009 | Li .......................... H04N 23/73 348/E3.018 |
| 2013/0135486 A1* | 5/2013 | Wan ....................... H04N 5/765 348/207.99 |
| 2016/0366350 A1* | 12/2016 | Roffet ..................... H10F 39/18 |

* cited by examiner

*Primary Examiner* — Lin Ye
*Assistant Examiner* — Chan T Nguyen

(57) ABSTRACT

An image pickup apparatus in which noise caused by global shutter driving of an image pickup device can be suppressed. The image pickup apparatus comprises an image pickup device including pixels each including a photoelectric conversion part that generates a charge by photoelectric conversion and charge storage parts that are connected to the photoelectric conversion part and store a charge transferred from the photoelectric conversion part, and a controller configured to control to switch a driving mode of the image pickup device according to exposure setting, wherein the driving mode includes a first mode in which the charge is transferred from the photoelectric conversion part to the charge storage part in multiple transfers in one frame period, and a second mode in which the charge is transferred from the photoelectric conversion part to the charge storage part only once in one frame period.

10 Claims, 19 Drawing Sheets

IMAGE PICKUP APPARATUS IN WHICH GLOBAL SHUTTER DRIVING OF IMAGE PICKUP DEVICE IS PERFORMED

BACKGROUND OF THE INVENTION

Field of the Invention

The present invention relates to an image pickup apparatus in which global shutter driving of an image pickup device is performed.

Description of the Related Art

A CMOS image sensor as the image pickup device includes an image sensor (hereinafter referred to as a "GS sensor") having a global shutter (hereinafter referred to as "GS") function by having a memory part (charge storage part) in each pixel. The pixel of the GS sensor includes a gate that transfers signal charges stored in a photoelectric conversion part to a charge storage part. In the GS sensor, by the signal charges being simultaneously transferred from the photoelectric conversion part to the charge storage part for all pixels, start and end timings of signal storage in the photoelectric conversion part are the same for all the pixels, and a GS function is realized.

Further, as disclosed in U.S. Patent Publication No. 2013/0135486, a GS sensor is known, which has a plurality of charge storage parts for one photoelectric conversion part and transfers the signal charges to each charge storage part a plurality of times in one frame period. With this GS sensor, it is possible to improve a dynamic range by acquiring a plurality of images generated by changing a total storage time of the signal charges transferred to each charge storage part. For example, by acquiring the plurality of images generated with different storage times and combining the plurality of images, one image with a high dynamic range can be obtained.

However, in the GS sensor, output of each control signal is performed simultaneously for all the pixels. Therefore, in some cases, current fluctuation when the control signal is input may be large, and noise may occur in a video signal at a timing when the control signal is input. For example, the noise occurs at a transfer timing of the signal charge to each charge storage part. In particular, for example, in a case where a gain, which is one of parameters for determining exposure of a camera, is set high, the noise is remarkably recognized.

SUMMARY OF THE INVENTION

The present invention provides an image pickup apparatus in which noise caused by global shutter driving of an image pickup device can be suppressed.

Accordingly, the present invention provides an image pickup apparatus comprising an image pickup device including a plurality of pixels each including a photoelectric conversion part that generates a charge by photoelectric conversion, and at least two charge storage parts that are connected to the photoelectric conversion part and store a charge transferred from the photoelectric conversion part, and a controller configured to perform control to switch a driving mode of the image pickup device between a first mode and a second mode according to exposure setting, wherein the driving mode includes the first mode in which the charge is transferred from the photoelectric conversion part to the charge storage part in multiple transfers in one frame period, and the second mode in which the charge is transferred from the photoelectric conversion part to the charge storage part only once in one frame period.

According to the present invention, the noise caused by global shutter driving of the image pickup device can be suppressed.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
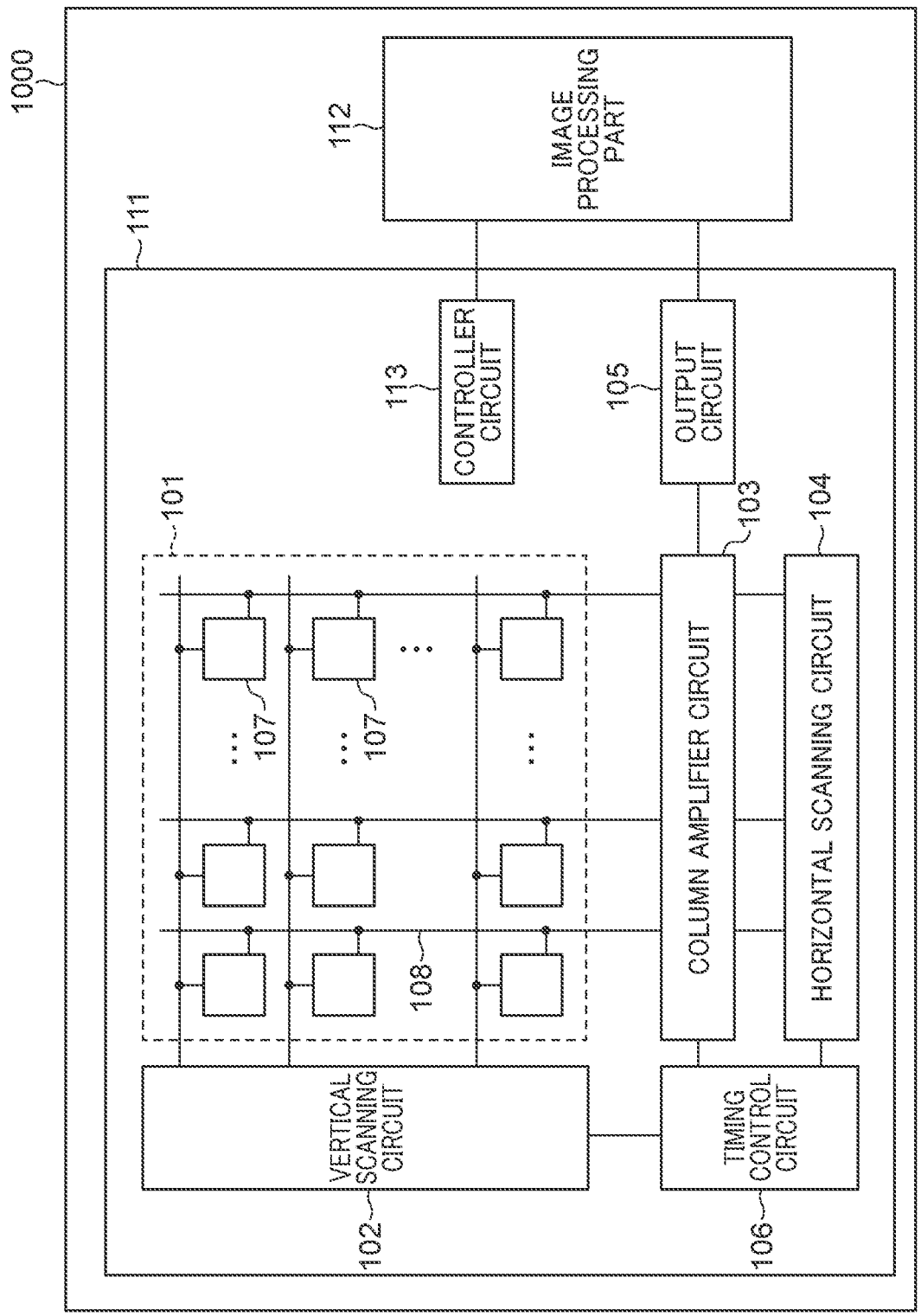
FIG. 1 is a block diagram of an image pickup apparatus.

FIG. 1 is a block diagram of an image pickup apparatus 1000 equipped with an image pickup device 111 according to a first embodiment of the present invention. The image pickup apparatus 1000 includes the image pickup device 111 and an image processing part 112. The imaging element 111, which is a solid-state image pickup device, includes a pixel part 101, a vertical scanning circuit 102, a column amplifier circuit 103, a horizontal scanning circuit 104, an output circuit 105, a timing control circuit 106, and a controller circuit 113.

The controller circuit 113 is an interface part between the image pickup device 111 and the image processing part 112, and communicates with the image processing part 112 by serial communication. The controller circuit 113 receives a control signal to the image pickup device 111 output from the image processing part 112 via serial communication. For example, the image processing part 112 obtains luminance on the basis of a pixel signal output from the image pickup device 111, and determines exposure setting (an exposure setting value) of diaphragm, an exposure time (a charge storage time) and the like on the basis of the obtained luminance. Then, the image processing part 112 transmits the determined exposure setting as the control signal to the controller circuit 113, and the controller circuit 113 transmits the received control signal to the timing control circuit 106.

In plan view of a substrate, the pixel part 101 is a pixel array including a plurality of pixels 107 arranged two-dimensionally including a plurality of rows and a plurality of columns.

The vertical scanning circuit 102 supplies the control signal to a plurality of transistors included in the pixel 107 to control on (conductive state) or off (non-conductive state) of the plurality of transistors. A signal line 108 is provided for each column of the pixels 107, and a signal from the pixel 107 is output to the signal line 108 for each column. The column amplifier circuit 103 includes an amplifier for amplifying the pixel signal output to the signal line 108 and an AD conversion circuit for converting an analog signal into a digital signal. The column amplifier circuit 103 performs processing, such as correlated double sampling processing on the pixel signal output to the signal line 108, on the basis of a signal at the time of reset release of the pixel 107 and a signal at the time of photoelectric conversion of the pixel 107.

The horizontal scanning circuit 104 supplies the control signal to a switch connected to the column amplifier circuit 103 in each column, and controls the switch to be turned on or off. The timing control circuit 106 controls the vertical scanning circuit 102, the column amplifier circuit 103, and the horizontal scanning circuit 104. The output circuit 105, which has a serializer function, converts the pixel signal from the column amplifier circuit 103 into a serial signal, and outputs the serial signal.

The pixel signal output from the output circuit 105 is input to the image processing part 112, development processing such as various adjustment/correction processing is performed on the pixel signal in the image processing part 112, and the pixel signal subjected to the development processing is output to a monitor and/or recorded on a recording medium. Therefore, the image processing part 112 processes the signal output from the image pickup device 111 to generate image data.

Figure 2:
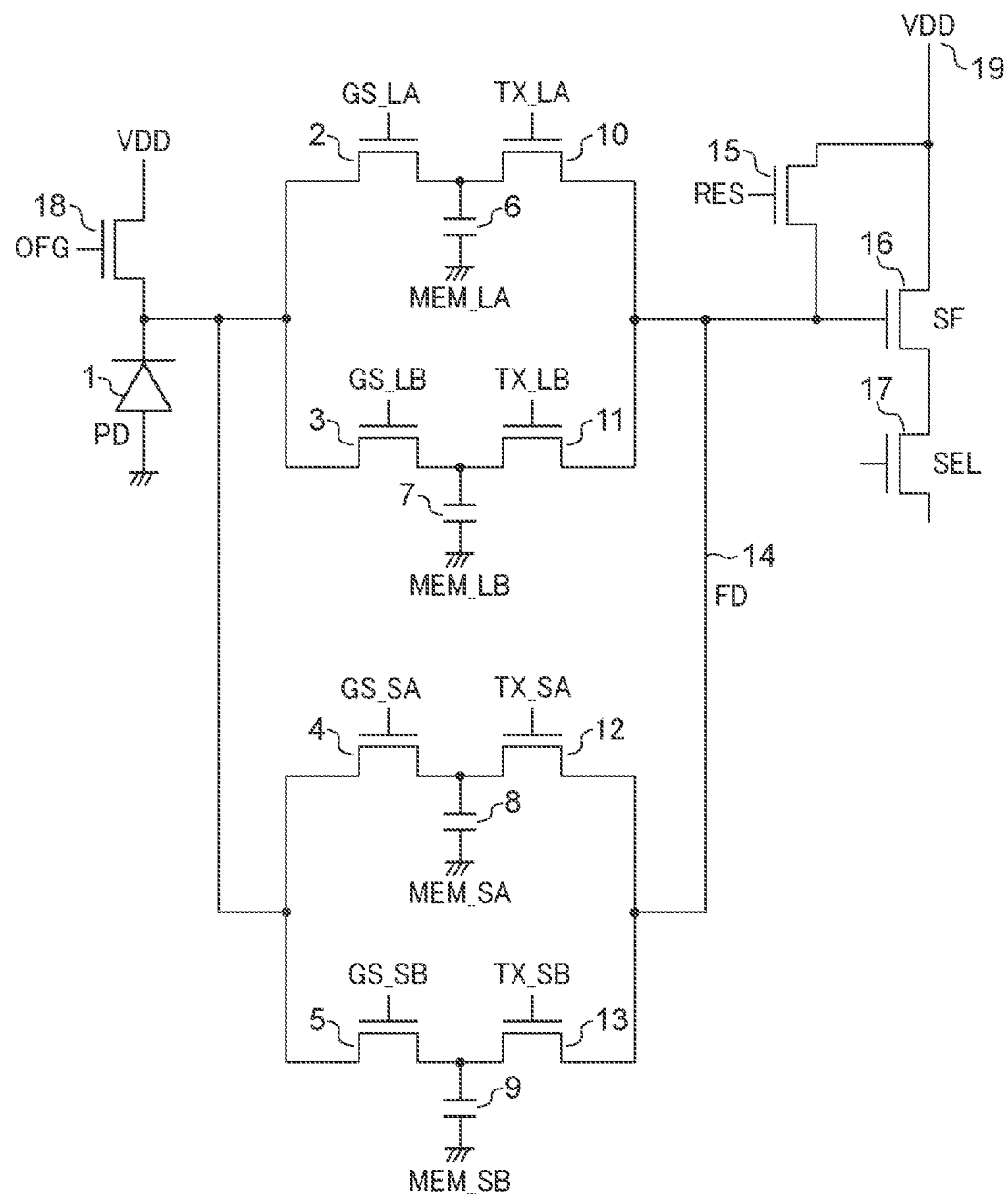
FIG. 2 is an equivalent circuit diagram of one pixel.

FIG. 2 is an equivalent circuit diagram of one pixel 107.

A photoelectric conversion part PD1 is a photodiode that generates charges by photoelectric conversion of incident photons. A charge transfer part GS_LA 2, a charge transfer part GS_LB 3, a charge transfer part GS_SA 4, and a charge transfer part GS_SB 5 transfer signal charges generated by the photoelectric conversion part PD1 respectively to a charge storage part MEM_LA 6, a charge storage part MEM_LB 7, a charge storage part MEM_SA 8, and a charge storage part MEM_SB 9 in subsequent stages. The charge storage parts MEM_LA 6, MEM_LB 7, MEM_SA 8, and MEM_SB 9 respectively hold the transferred signal charges. A transfer part TX_LA 10, a transfer part TX_LB 11, a transfer part TX_SA 12, and a transfer part TX_SB 13 respectively transfer the signal charges held in the charge storage parts MEM_LA 6, MEM_LB 7, MEM_SA 8, and MEM_SB 9 in preceding stages, to a circuit element in a subsequent stage.

An FD 14, which is an input node of an amplification part to be described later, holds the signal charges to be transferred from the charge storage parts in the preceding stages via the transfer parts. For the FD 14, for example, a floating diffusion region (an FD region) disposed on a semiconductor substrate can be used.

An RES 15, which is a reset part, supplies a reference voltage to the FD 14 which is the input node of the amplification part. An SF 16, which is the amplification part, amplifies a signal based on the signal charge transferred to the FD region and outputs the amplified signal to the outside. As an example, the SF 16 is a source follower circuit using a MOS transistor. A configuration in which a gate of the MOS transistor and the floating diffusion region are electrically connected can be used. In this configuration, the plurality of transfer parts (TX_LA 10, TX_LB 11, TX_SA 12, TX_SB 13) shares the FD 14 and the SF 16 of the input node; however, a circuit configuration that does not share the FD 14 or the SF 16 may be adopted.

SEL 17, which is a selection part, can select each pixel and read out a signal (pixel signal) based on the signal charge, to the outside for each pixel or each pixel row. OFG 18, which is a charge discharging control part, discharges unnecessary charges of the photoelectric conversion part PD1. As the OFG 18, for example, the MOS transistor can be used. In this case, a configuration is adopted in which a semiconductor region having the same polarity as the signal charge constituting a part of the photoelectric conversion part PD1 is used as a source, and a semiconductor region (an overflow drain region: OFD region) to which a power supply voltage VDD 19 is supplied is used as a drain. It should be noted that the MOS transistor can be used for each of the transfer part, the reset part, the selection part, and the charge discharging control part.

When turned on, the charge transfer part GS_LA 2 transfers the signal charge generated by the photoelectric conversion part PD1 to the charge storage part MEM_LA 6. When turned on, the charge transfer part GS_LB 3 transfers the signal charge generated by the photoelectric conversion part PD1 to the charge storage part MEM_LB 7. When turned on, the charge transfer part GS_SA 4 transfers the signal charge generated by the photoelectric conversion part PD1 to the charge storage part MEM_SA 8. When turned on, the charge transfer part GS_SB 5 transfers the signal charge generated by the photoelectric conversion part PD1 to the charge storage part MEM_SB 9.

When turned on, the transfer part TX_LA 10 transfers the signal charge held in the charge storage part MEM_LA 6 to the FD 14. When turned on, the transfer part TX_LB 11 transfers the signal charge held in the charge storage part MEM_LB 7 to the FD 14. When turned on, the transfer part TX_SA 12 transfers the signal charge held in the charge storage part MEM_SA 8 to the FD 14. When turned on, the transfer part TX_SB 13 transfers the signal charge held in the charge storage part MEM_SB 9 to the FD 14.

Note that, in the present embodiment, "a set of the MEM_LA 6 and the MEM_SA 8" or "a set of the MEM_LB 7 and the MEM_SB 9" corresponds to "at least two charge storage parts that store the charges transferred from the photoelectric conversion part". For example, the MEM_LA 6 and the MEM_SA 8 are connected in parallel, in the subsequent stage of the photoelectric conversion part PD1. The MEM_LB 7 and the MEM_SB 9 are connected in parallel, in the subsequent stage of the photoelectric conversion part PD1.

In the following description, the term "charge storage part" of the charge storage part MEM_LA 6, etc., the term "charge transfer part" of the charge transfer part GS_LA 2, etc., and the term "transfer part" of the transfer part TX_LA 10, etc. may be appropriately omitted.

Next, a method for driving the pixel part 101 will be described with reference to FIGS. 3, 4, and 5.

The timing control circuit 106 can transfer the charges from the photoelectric conversion part to the charge storage part collectively for all the pixels. A pixel driving mode executable by the timing control circuit 106 includes a first mode and a second mode. The first mode is a mode in which the charges are transferred from the photoelectric conversion part to the charge storage part in multiple transfers (intermittently) in one frame period. The second mode is a mode in which the charges are transferred from the photoelectric conversion part to the charge storage part only once in one frame period.

Figure 3:
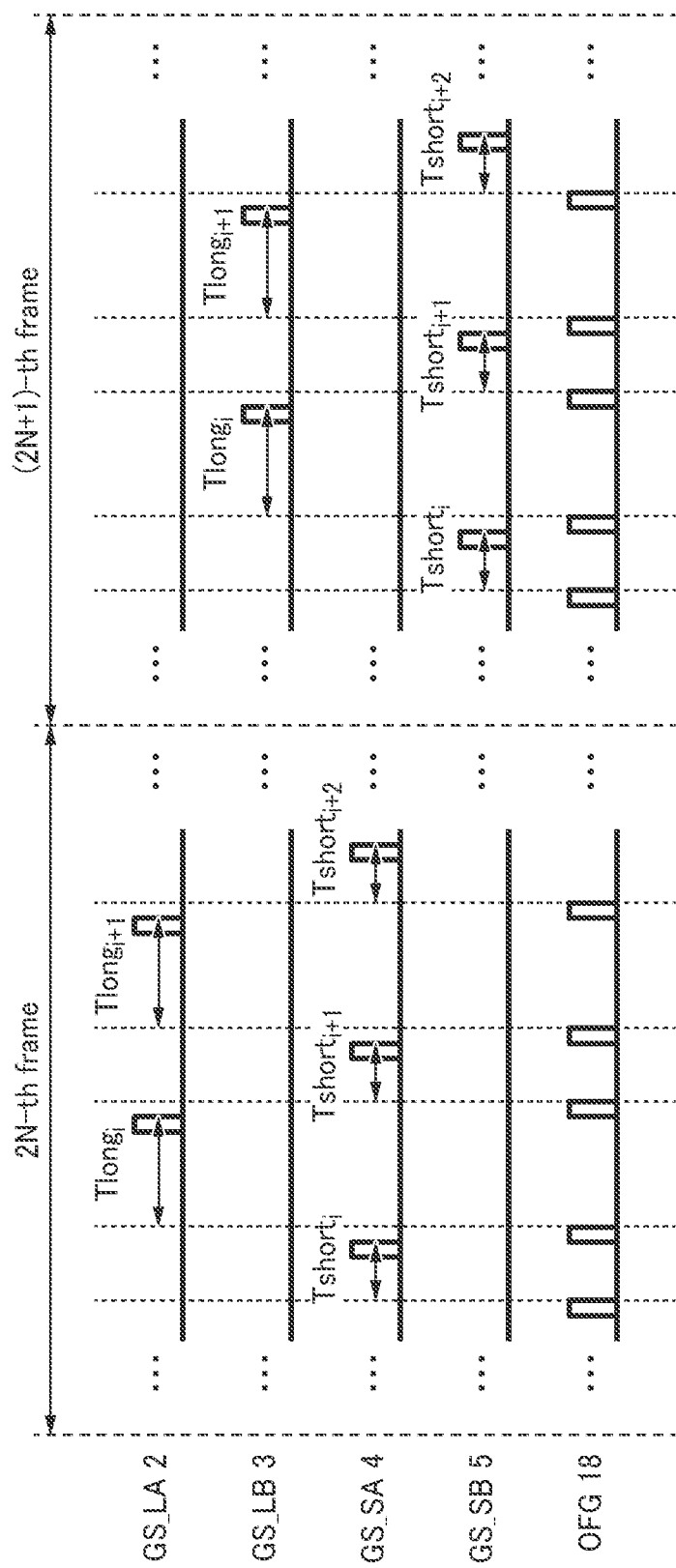
FIG. 3 is a timing chart of exposure driving in a first mode.
Figure 4:
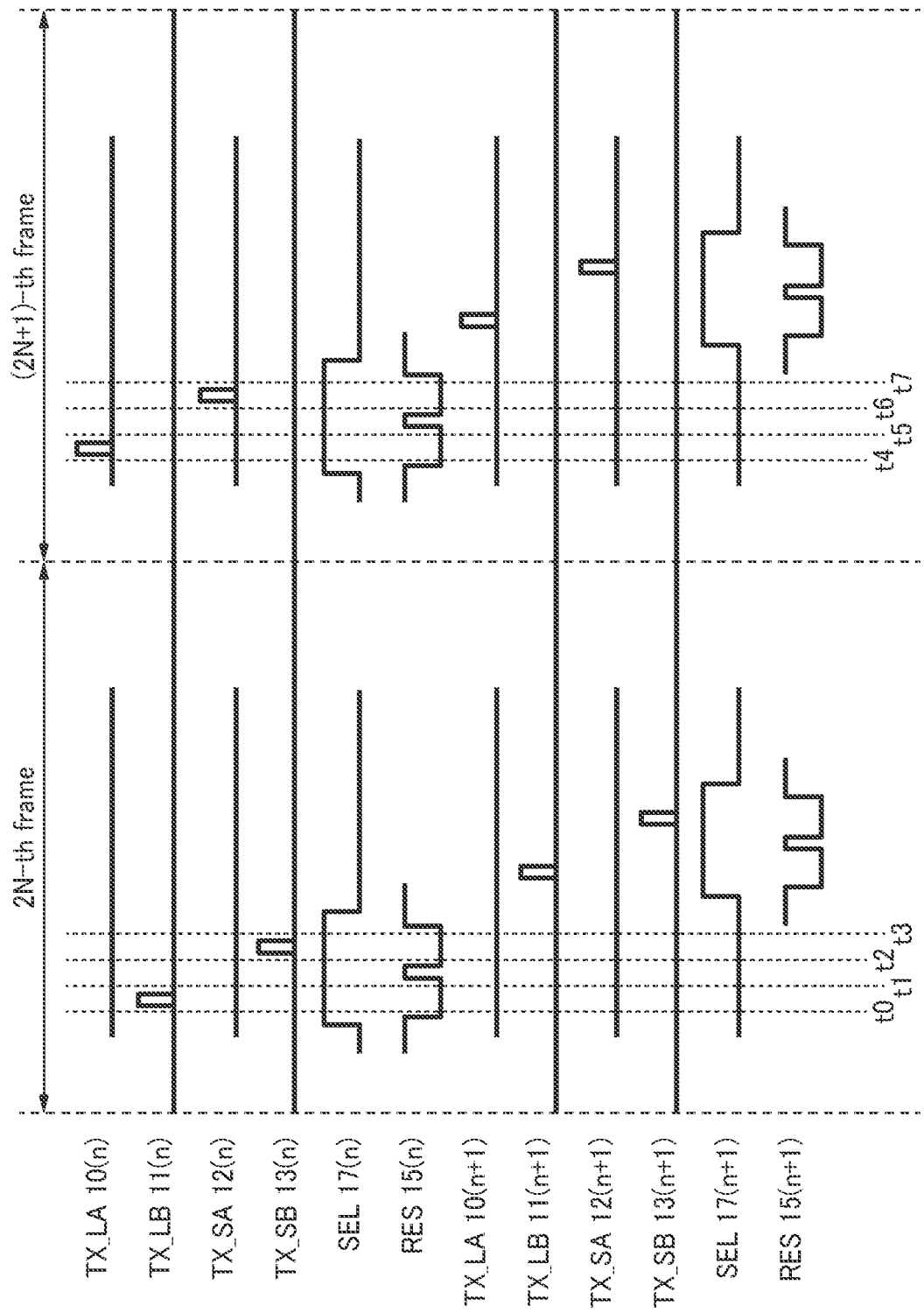
FIG. 4 is a timing chart of read-out driving in the first mode.
Figure 5:
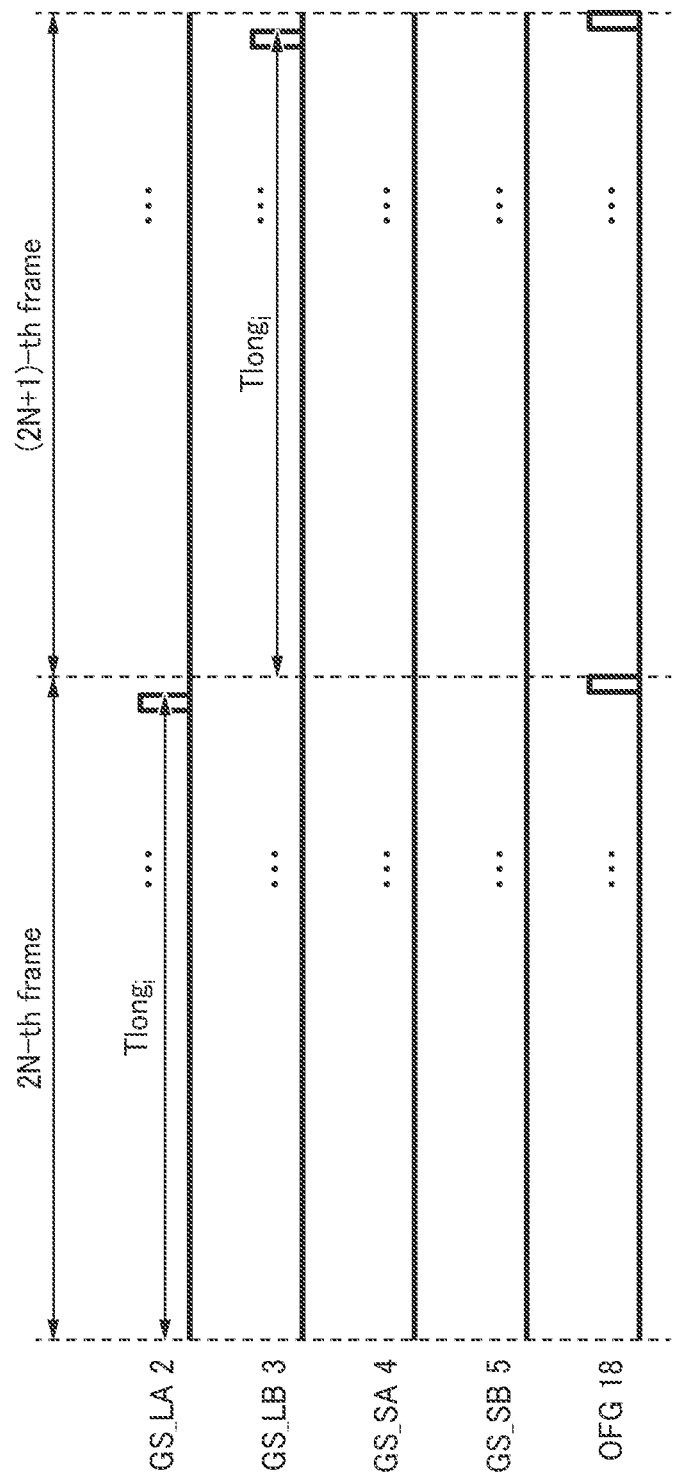
FIG. 5 is a timing chart of exposure driving in a second mode.

FIGS. 3 to 5 are timing charts showing time series transition of driving pulses supplied to control electrodes and transfer electrodes. In particular, FIGS. 3 and 5 show driving related to exposure of one pixel, and FIG. 4 shows driving related to signal reading out for a plurality of rows of the pixels. FIGS. 3 and 4 show driving in the first mode, and FIG. 5 shows driving in the second mode.

In FIG. 4, a suffix "n" represents a row number of a pixel. A suffix (n) of each control line indicates the n-th row, and a suffix (n+1) indicates the (n+1)-th row. Although only two rows will be described here, a case where three or more rows are provided can be handled by repeating this driving pattern. In the global shutter type image pickup apparatus, since driving timing is the same for all rows with respect to driving related to the exposure, the suffixes are omitted and the notations for the all rows are not indicated. High of the pulse means active.

Regarding driving related to reading out, drive timings of the transfer parts TX_LA 10, TX_LB 11, TX_SA 12, TX_SB 13, SEL 17, and RES 15 are different depending on the rows, the suffixes and the notations for the rows are used.

First, driving related to the exposure in the first mode will be described with reference to FIG. 3. As shown in FIG. 3, in the first mode, in an even-numbered frame (2N-th frame), the signal charge generated by the photoelectric conversion part PD1 is transferred to the charge storage part MEM_LA 6 and stored, when the charge transfer part GS_LA 2 is turned on. Further, the signal charge generated by the photoelectric conversion part PD1 is transferred to the storage part MEM_SA 8 and stored, when the charge transfer part GS_SA 4 is turned on.

In the first mode, the timing control circuit 106 controls so as to transfer the charges from the photoelectric conversion part PD1 to charge storage parts at different timings from each other, in one frame period. Charge transfer driving can be performed a plurality of times in one frame period. In an example shown in FIG. 3, the signal charge generated in the photoelectric conversion part PD1 is alternately transferred to the charge storage part MEM_LA 6 and the charge storage part MEM_SA 8.

"Tshorti" in FIG. 3 indicates a storage time of an i-th signal charge among charge transfers repeated a plurality of times (for example, "Nshort" times) in the even-numbered frame (2N-th frame). The storage time Tshorti is a time from when the OFG 18 is turned on and the photoelectric conversion part PD1 is reset to when the charge transfer part GS_SA 4 is turned on, the signal charge is transferred from the photoelectric conversion part PD1 to the charge storage part MEM_SA 8, and the charge transfer part GS_SA 4 is turned off.

It should be noted that although the photoelectric conversion part PD1 is reset by the OFG 18 here, the reset by the OFG 18 may be omitted in a case where it is configured so that the signal charge does not remain in the photoelectric conversion part PD1 at the time of transfer. The storage time Tshorti in this case can be a time from when the immediately preceding charge transfer driving is completed to when the charge transfer part GS_SA 4 is turned off.

In the even-numbered frame (2N-th frame), a total storage time "Tshort" for the signal charges stored in the charge storage part MEM_SA 8 is a time obtained by summing storage times Tshorti from a first to an Nshort-th time. The storage times Tshorti for the signal charges from the first time to the Nshort-th time, may be the same length or may be different from one another.

"Tlongi" in FIG. 3 indicates a storage time of an i-th signal charge among charge transfers repeated a plurality of times (for example, "Nlong" times) in the even-numbered frame (2N-th frame). The storage time Tlongi is a time from when the OFG 18 is turned on and the photoelectric conversion part PD1 is reset to when the charge transfer part GS_LA 2 is turned on, the signal charge is transferred from the photoelectric conversion part PD1 to the charge storage part MEM_LA 6, and the charge transfer part GS_LA 2 is turned off.

It should be noted that although the photoelectric conversion part PD1 is reset by the OFG 18 here, the reset by the OFG 18 may be omitted in a case where it is configured so that the signal charge does not remain in the photoelectric conversion part PD1 at the time of transfer. The storage time Tlongi in this case can be a time from when the immediately preceding charge transfer driving is completed to when the charge transfer part GS_LA 2 is turned off.

In the even-numbered frame (2N-th frame), a total storage time "Tlong" for the signal charges stored in the charge storage part MEM_LA 6 is a time obtained by summing storage times Tlongi from a first to an Nlong-th time. The storage times Tlongi for the signal charges from the first time to the Nlong-th time, may be the same length or may be different.

As described above, in the first mode, control is performed such that the signal charges are transferred to the charge storage parts at different timings from each other in multiple transfers, from the photoelectric conversion part, in one frame period. At this time, by controlling the charge storage times in the charge storage parts in the one frame to be different from each other, it is possible to output an image with a high dynamic range.

The signal reading out in the first mode will be described with reference to FIG. 4. First, the signal reading out in the even-numbered frame (2N-th frame) shown in FIG. 4 will be described.

Here, the signal charges stored in the MEM_LB 7 and the MEM_SB 9 in an odd-numbered frame ((2N−1)-th frame, not shown) one frame before, are read out. Signal reading out processing for the n-th row, in the case of sequentially reading out for the rows, will be described.

The timing control circuit 106 turns on SEL 17(n), so as to read out a signal based on the charge of the FD 14 of the pixel of the n-th row. The timing control circuit 106 turns on the SEL 17(n) and turns off RES 15(n) configured to reset the FD 14, and reads out a reset release level voltage VRES of the FD 14 (time t0). Next, the timing control circuit 106 turns on the TX_LB 11(n), transfers the signal charge held in the MEM_LB 7 to the FD 14, and reads out a signal level VSIG of the FD 14 (time t1). |VSIG−VRES|, which is a difference between the two read-out signal levels, is a signal level proportional to a signal charge amount of the MEM_LB 7.

The timing control circuit 106 turns on the RES 15(n) and further turns the RES 15(n) off, to reset the FD 14, and reads out the reset release level voltage VRES of the FD 14 (time t2). Next, the timing control circuit 106 turns on TX_SB 13(*n*), transfers the signal charge held in the MEM_SB 9 to the FD 14, and reads out the signal level VSIG of the FD 14 (time t3). |VSIG−VRES|, which is a difference between the two read-out signal levels, is a signal level proportional to a signal charge amount of the MEM_SB 9. The timing control circuit 106 repeats this procedure in row order in all regions or in regions targeted for the acquirement, and acquires signals based on the stored charges of the MEM_LB 7 and the MEM_SB 9, as pixel signals.

As shown in FIG. 3, in the first mode, in an odd-numbered frame ((2N+1)-th frame), the signal charge generated by the photoelectric conversion part PD1 is transferred to the charge storage part MEM_LB 7 and stored, when the charge transfer part GS_LB 3 is turned on. Further, the signal charge generated by the photoelectric conversion part PD1 is transferred to the storage part MEM_SB 9 and stored, when the charge transfer part GS_SB 5 is turned on.

It should be noted that the driving timing of the charge transfer parts GS_LB 3 and GS_SB 5 in the odd-numbered frame ((2N+1)-th frame) may be the same as the driving timing of the charge transfer parts GS_LA 2 and GS_SA 4 in the even-numbered frame (2N-th frame). Further, the driving timing of the OFG 18 in the odd-numbered frame ((2N+1)-th frame) may be the same as the driving timing of the OFG 18 in the even-numbered frame (2N-th frame).

Next, the signal reading out in the odd-numbered frame ((2N+1)-th frame) shown in FIG. 4 will be described.

Here, the signal charges stored in the MEM_LA 6 and the MEM_SA 8 in the even-numbered frame (2N-th frame) one frame before, are read out. Signal reading out processing for the n-th row, in the case of sequentially reading out for the rows, will be described.

The timing control circuit 106 turns on SEL 17(*n*), so as to read out a signal based on the charge of the FD 14 of the pixel of the n-th row. The timing control circuit 106 turns on the SEL 17(*n*) and turns off the RES 15(*n*) configured to reset the FD 14, and reads out the reset release level voltage VRES of the FD 14 (time t4). Next, the timing control circuit 106 turns on the TX_LA 10(*n*), transfers the signal charge held in the MEM_LA 6 to the FD 14, and reads out the signal level VSIG of the FD 14 (time t5). |VSIG−VRES|, which is a difference between the two read-out signal levels, is a signal level proportional to a signal charge amount of the MEM_LA 6.

The timing control circuit 106 turns on the RES 15(*n*) again and further turns the RES 15(*n*) off, to reset the FD 14, and reads out the reset release level voltage VRES of the FD 14 (time t6). Next, the timing control circuit 106 turns on TX_SA 12(*n*), transfers the signal charge held in the MEM_SA 8 to the FD 14, and reads out the signal level VSIG of the FD 14 (time t7). |VSIG−VRES|, which is a difference between the two read-out signal levels, is a signal level proportional to a signal charge amount of the MEM_SA 8. The timing control circuit 106 repeats this procedure in row order in all the regions or in the regions targeted for the acquirement, and acquires signals based on the stored charges of the MEM_LA 6 and the MEM_SA 8, as the pixel signals.

A value of the storage time Tlongi and a value of the storage time Tshorti may be different from each other. As a result, it is possible to acquire two types of images having different effective exposure amounts in the same frame. One image with a high dynamic range can be obtained by correcting the signals of one of the two types of images by an amount of storage time and then combining the signals to generate one image.

That is, the image processing part 112 (controller) can read out the signals generated on the basis of the signal charges held in the charge storage parts to perform image generation and image synthesis. Here, a ratio of the storage time Tlongi to the storage time Tshorti is defined as a predetermined ratio. The timing control circuit 106 controls the exposure time so that the charges are stored in the plurality of charge storage parts at the predetermined ratio. Then, as described above, the image processing part 112 combines the signals of at least two charge storage parts to generate one image. At that time, the image processing part 112 performs calculation on the basis of the predetermined ratio of the exposure time and then combines the images.

As described above, the pixel 107 has, for one photoelectric conversion part PD1, two charge storage parts that store signal charges to be transferred, and has two charge storage parts that hold charges until the signal reading out of the next frame. Thus, it is possible to acquire a seamless moving image having no time domain in which an image cannot be acquired, while having a high dynamic range.

On the other hand, for example, there is a possibility that if the signal charges in the charge storage parts MEM_LB 7 and MEM_SB 9 are read out at the timing of transferring the charges to the charge storage parts MEM_LA 6 and MEM_SA 8, noise is added to the signal due to influence of current fluctuation or the like. In addition, in the first mode, since the charge is intermittently transferred to one charge storage part within one frame period, photographing sensitivity is lower than that in a case where the charge is not intermittently transferred.

Next, the driving related to the exposure in the second mode will be described with reference to FIG. 5. The second mode is suitable, for example, in case where improvement in photographing sensitivity is required or in a case where a high dynamic range is not required.

Tlongi in FIG. 5 indicates the storage time of the signal charge in a transfer performed once in each of the even-numbered frame (2N-th frame) and the odd-numbered frame ((2N+1)-th frame). As shown in FIG. 5, in the second mode, in the even-numbered frame (2N-th frame), when the charge transfer part GS_LA 2 is turned on, the signal charge generated by the photoelectric conversion part PD1 is transferred only to the charge storage part MEM_LA 6 and stored. The charge transfer driving to the charge storage part MEM_LA 6 is performed only once in one frame.

In the odd-numbered frame ((2N+1)-th frame), when the charge transfer part GS_LB 3 is turned on, the signal charge generated by the photoelectric conversion part PD1 is transferred only to the charge storage part MEM_LB 7 and stored. The charge transfer driving to the charge storage part MEM_LB 7 is performed only once in one frame.

It should be noted that the driving timing of the charge transfer part GS_LB 3 in the odd-numbered frame ((2N+1)-th frame) may be the same as the driving timing of the charge transfer part GS_LA 2 in the even-numbered frame (2N-th frame). Further, the driving timing of the OFG 18 in the odd-numbered frame ((2N+1)-th frame) may be the same as the driving timing of the OFG 18 in the even-numbered frame (2N-th frame).

It should be noted that an operation related to the signal reading out in the second mode may be basically the same as that shown in FIG. 4. That is, the signal charge in the charge storage part MEM_LB 7 is read out in the even-numbered frame (2N-th frame), and the signal charge in the charge storage part MEM_LA 6 is read out in the odd-numbered frame ((2N+1)-th frame). However, since the charge is not transferred to the MEM_SA 8 or the MEM_SB 9, a reading out operation of the charge from the MEM_SA 8 or the MEM_SB 9 is not performed.

As described above, in the second mode, since storage of the signal charge in the photoelectric conversion part PD1 is not performed a plurality of times in one frame period, it is possible to prevent the current fluctuation or the like occurred by transferring the charge to the charge storage part from affecting the reading out of the signal charge. In addition, since the charge is not intermittently transferred to the charge storage part within one frame period, the photographing sensitivity is higher than that in a case where the charge is intermittently transferred.

Next, switching of the driving mode will be described with reference to FIG. 6.

Figure 6:
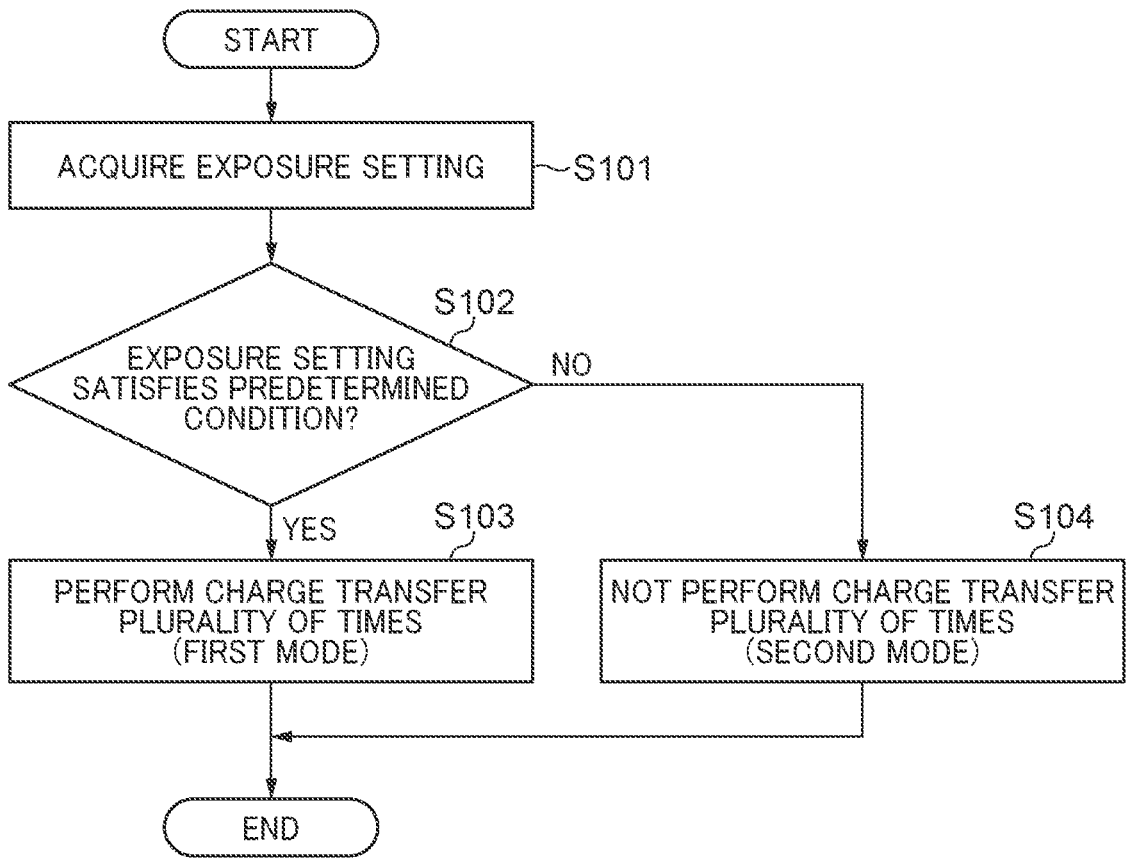
FIG. 6 is a flowchart showing driving mode switching processing.

FIG. 6 is a flowchart showing driving mode switching processing. This processing is implemented by a CPU (not shown) included in the image processing part 112 reading out and executing a program stored in a storage part (not shown) such as a ROM in the image pickup apparatus 1000, and transmitting the control signal to the controller circuit 113 of the image pickup device 111. This processing is started, for example, in response to setting of exposure for photographing in the image pickup apparatus 1000.

First, in S101, the CPU of the image processing part 112 acquires the exposure setting (value) set in the image pickup apparatus 1000. The exposure setting includes, for example, setting of ISO sensitivity and gain setting in signal processing.

In S102, the CPU of the image processing part 112 determines whether or not the acquired exposure setting satisfies a predetermined condition. Here, to "satisfy the predetermined condition" means that "the set ISO sensitivity is not higher than a first predetermined value, and the set gain value is not higher than a second predetermined value". Therefore, in a case where "the set ISO sensitivity is higher than the first predetermined value" and/or "the set gain value is higher than the second predetermined value", the predetermined condition is not satisfied. The CPU of the image processing part 112 advances the process to S103 in a case where the acquired exposure setting satisfies the predetermined condition, and advances the process to S104 in a case where the acquired exposure setting does not satisfy the predetermined condition.

A scene in which S103 is performed is, because it is a situation in which the set ISO sensitivity and gain are low, a scene in which the high dynamic range is more important than the improvement of the photographing sensitivity. Therefore, the CPU of the image processing part 112 transmits the control signal to the controller circuit 113 of the image pickup device 111 so that the timing control circuit 106 executes the first mode (FIG. 3). Thus, the CPU of the image processing part 112 performs control such that the image pickup device 111 performs charge transfer to the charge storage part a plurality of times in one frame period, and reads out a signal capable of generating the image with a high dynamic range.

On the other hand, a scene in which S104 is performed is, because it is a situation in which the set ISO sensitivity and/or gain is high, a scene in which high photographing sensitivity is required. Therefore, the CPU of the image processing part 112 transmits the control signal to the controller circuit 113 of the image pickup device 111 so that the timing control circuit 106 executes the second mode (FIG. 5). Thus, the CPU of the image processing part 112 performs control such that the image pickup device 111 performs the charge transfer to the charge storage part only once (does not perform the charge transfer a plurality of times) to enhance the photographing sensitivity and suppresses influence of noise generated by the charge transfer. After processing of S103 and S104, the CPU of the image processing part 112 ends the driving mode switching processing.

According to the present embodiment, the CPU of the image processing part 112 switches the driving mode between the first mode and the second mode according to the exposure setting. For example, in the first mode, the charge is transferred from the photoelectric conversion part PD1 to the charge storage part (the MEM_LA 6 or the MEM_SA 8) in multiple transfers in one frame period.

In the second mode, the charge is transferred from the photoelectric conversion part PD1 to the charge storage part only once in one frame period.

In particular, in a case where the acquired exposure setting satisfies the predetermined condition, that is, in a case where the set ISO sensitivity and gain is low, the control in the first mode is performed. Thus, the image with a high dynamic range can be obtained as necessary. For example, by the charge storage times in the charge storage parts being controlled to be different from each other, it is possible to output the image with a high dynamic range.

In a case where the acquired exposure setting does not satisfy the predetermined condition, that is, in a case where the set ISO sensitivity and/or gain are high, the control in the second mode is performed. Thus, it is possible to improve the photographing sensitivity and suppress the noise. In particular, the noise can be effectively reduced by adopting the second mode in a situation in which the exposure setting is high and the noise is easily recognized remarkably. Therefore, the noise caused by the global shutter driving of the image pickup device 111 can be suppressed.

Figure 7:
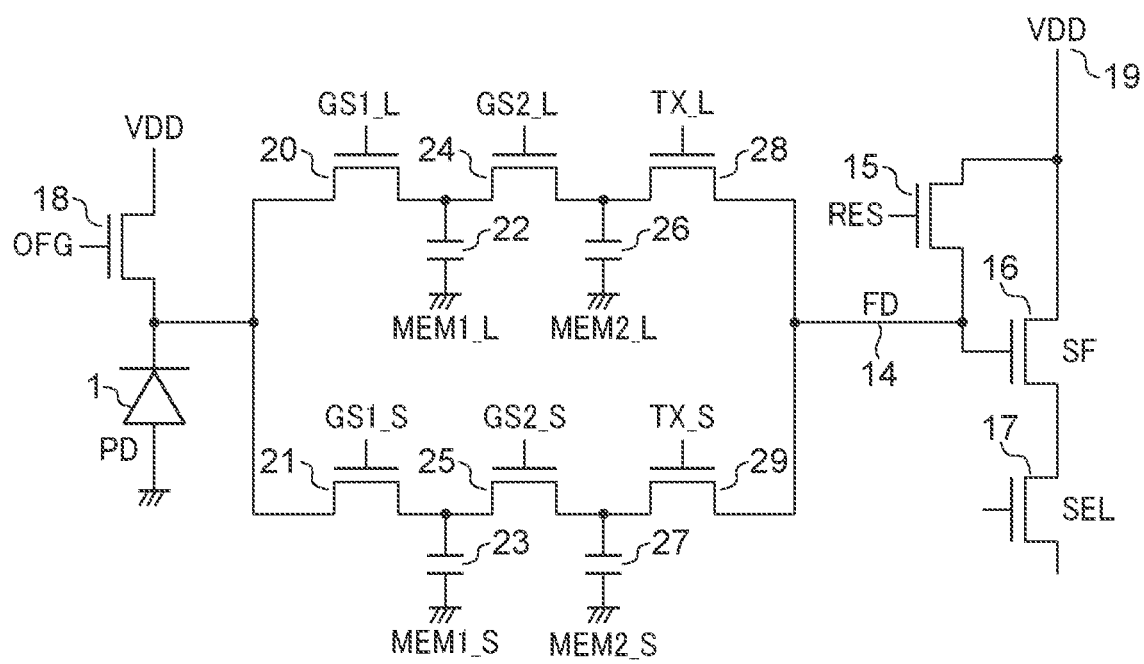
FIG. 7 is an equivalent circuit diagram of one pixel.

FIG. 7 is an equivalent circuit diagram of one pixel in the image pickup device 111 according to a second embodiment of the present invention. In the following description, the similar components to those of the first embodiment are denoted by the same reference numerals as those of the first embodiment, and a detailed description thereof will be omitted.

The second embodiment is different from the first embodiment in that there are two sets of "a plurality of (here, two) charge storage parts connected in series" between the photoelectric conversion part PD1 and the FD 14. In the first embodiment, four transfer parts are connected to the FD 14. On the other hand, in the present embodiment, since only two transfer parts are required to be connected to the FD 14, which can reduce capacitance of the FD 14, resulting in a circuit configuration resistant to the noise.

Each of a charge transfer part GS1_L 20, a charge transfer part GS2_L 24, a charge transfer part GS1_S 21, and a charge transfer part GS2_S 25 transfers the signal charge generated by the photoelectric conversion part PD1 to the charge storage part in the subsequent stage. Each of a charge storage part MEM1_L 22, a charge storage part MEM2_L 26, a charge storage part MEM1_S 23, and a charge storage part MEM2_S 27 holds the transferred signal charges. Each of a transfer part TX_L 28 and a transfer part TX_S 29 transfers the signal charges held in the charge storage part in the preceding stage to the circuit element in the subsequent stage.

When turned on, a charge transfer part GS1_L 20 transfers the signal charge generated by the photoelectric conversion part PD1 to the charge storage part MEM1_L 22. When turned on, the charge transfer part GS2_L 24 transfers the signal charge held in the charge storage part MEM1_L 22 to the charge storage part MEM2_L 26. When turned on, the charge transfer part GS1_S 21 transfers the signal charge generated by the photoelectric conversion part PD1 to the charge storage part MEM1_S 23. When turned on, the charge transfer part GS2_S 25 transfers the signal charge held in the charge storage part MEM1_S 23 to the charge storage part MEM2_S 27.

Note that, in the present embodiment, "a set of the MEM1_L 22 and the MEM1_S 23" corresponds to "at least two charge storage parts that store the charges transferred from the photoelectric conversion part". The MEM1_L 22 and the MEM1_S 23 are connected in parallel, in the subsequent stage of the photoelectric conversion part PD1.

Next, the method for driving the pixel part 101 in the present embodiment will be described with reference to FIGS. 8, 9, and 10.

Figure 8:
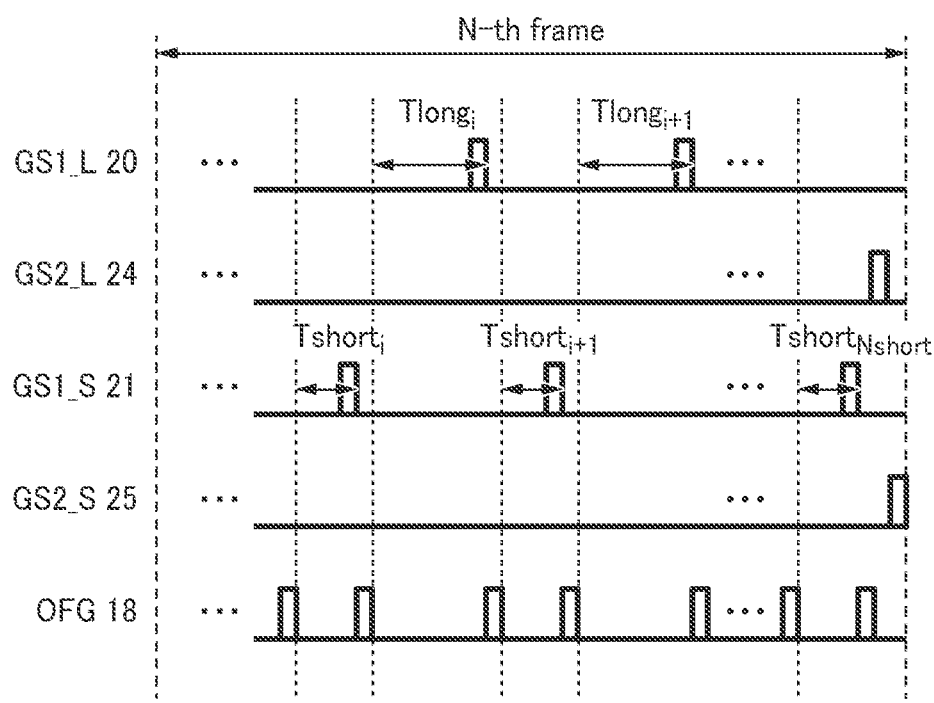
FIG. 8 is a timing chart of exposure driving in the first mode.
Figure 9:
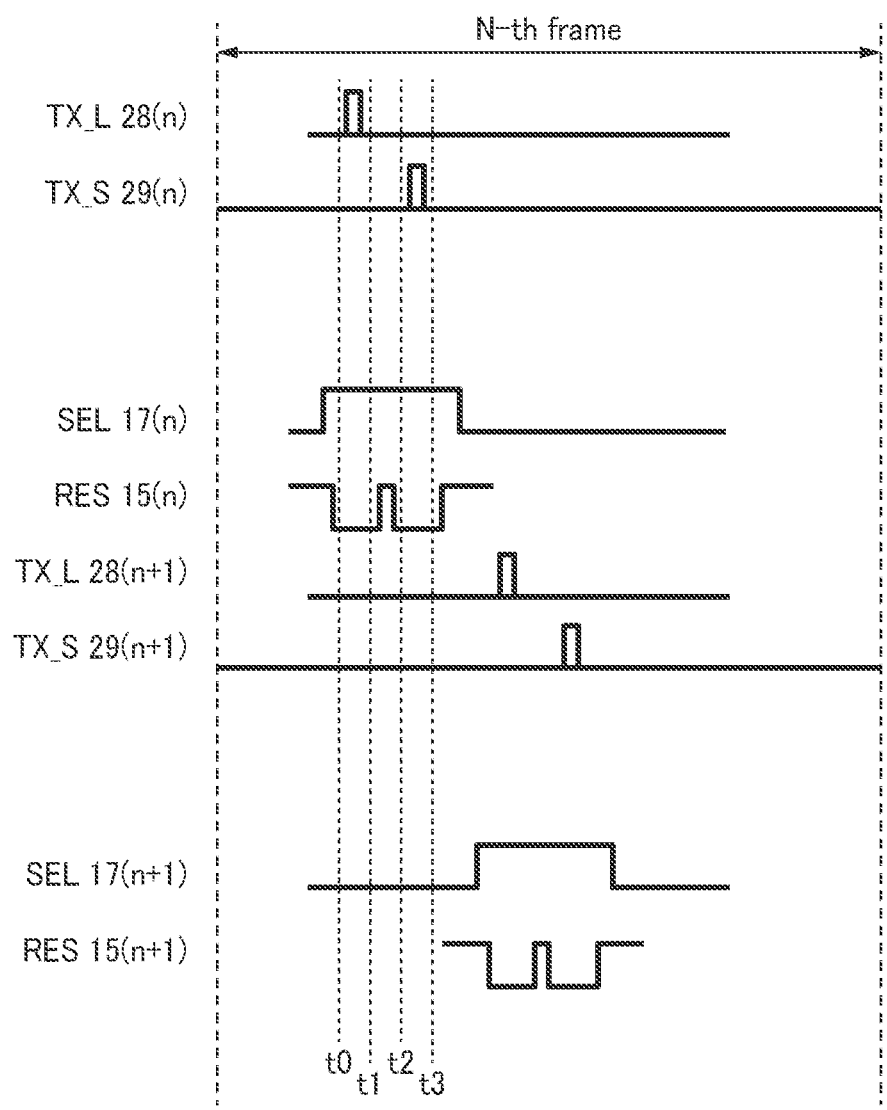
FIG. 9 is a timing chart of read-out driving in the first mode.
Figure 10:
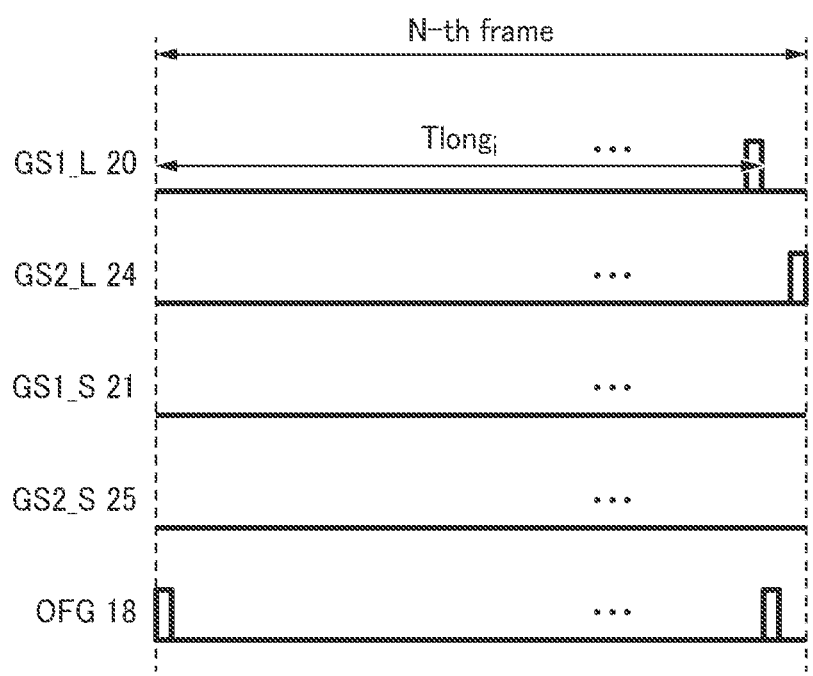
FIG. 10 is a timing chart of exposure driving in the second mode.

FIGS. 8 to 10 are timing charts showing the time series transition of the driving pulses supplied to the control electrodes and the transfer electrodes. In particular, FIGS. 8 and 10 show driving related to the exposure of one pixel, and FIG. 9 shows driving related to the signal reading out for a plurality of rows of the pixels. FIGS. 8 and 9 show driving in the first mode, and FIG. 10 shows driving in the second mode.

Meaning of the suffix "n" is similar to that described in the first embodiment. It should be noted that in the first embodiment, driving method for each of the even-numbered frame and the odd-numbered frame are shown, whereas in the present embodiment, driving method for only one frame is shown because there is no distinction in the driving method between the even-numbered frame and the odd-numbered frame.

As shown in FIGS. 8 and 9, in the first mode, the signal charge generated by the photoelectric conversion part PD1 is transferred to the charge storage part MEM1_L 22 and stored, when the charge transfer part GS1_L 20 is turned on. Further, the signal charge generated by the photoelectric conversion part PD1 is transferred to the storage part MEM1_S 23 and stored, when the charge transfer part GS1_S 21 is turned on. The signal charges of the charge storage parts MEM2_L 26 and MEM2_S 27 are read.

In the first mode, the timing control circuit 106 controls so as to transfer the charges from the photoelectric conversion part PD1 to charge storage parts at different timings from each other, in one frame period. Charge transfer driving can be performed a plurality of times in one frame period. In an example shown in FIG. 8, the signal charge generated in the photoelectric conversion part PD1 is alternately transferred to the charge storage part MEM1_L 22 and the charge storage part MEM1_S 23.

"Tshorti" in FIG. 8 indicates the storage time of the i-th signal charge among the charge transfers repeated a plurality of times (for example, "Nshort" times) in an N-th frame. The storage time Tshorti is a time from when the OFG 18 is turned on and the photoelectric conversion part PD1 is reset to when the charge transfer part GS1_S 21 is turned on, the signal charge is transferred from the photoelectric conversion part PD1 to the charge storage part MEM1_S 23, and the charge transfer part GS1_S 21 is turned off. A total storage time "Tshort" for the signal charges stored in the charge storage part MEM1_S 23 is a time obtained by summing the storage times Tshorti from the first to the Nshort-th time.

"Tlongi" in FIG. 8 indicates the storage time of the i-th signal charge among the charge transfers repeated a plurality of times (for example, "Nlong" times) in the N-th frame. The storage time Tlongi is a time from when the OFG 18 is turned on and the photoelectric conversion part PD1 is reset to when the charge transfer part GS1_L 20 is turned on, the signal charge is transferred from the photoelectric conversion part PD1 to the charge storage part MEM1_L 22, and the charge transfer part GS1_L 20 is turned off. The total storage time "Tlong" for the signal charges stored in the charge storage part MEM1_L 22 is a time obtained by summing the storage times Tlongi for the signal charges from the first to the Nlong-th time.

At the time when each charge transfer (Nshort-th charge transfer in FIG. 8) in the frame (N-th frame) is completed, the charge in the charge storage part MEM1_S 23 can be transferred to the charge storage part MEM2_S 27 in the subsequent stage. At this time, it is assumed that the signal charges acquired in a (N−1)-th frame, which is the previous frame, and held in the charge storage part MEM2_S 27 are read for all the rows.

The charge transfer part GS2_S 25 is turned on, and the charge is transferred from the charge storage part MEM1_S 23 to the charge storage part MEM2_S 27. Similarly for the charge storage part MEM1_L 22, the charge transfer part GS2_L 24 is turned on, and the charge is transferred from the charge storage part MEM1_L 22 to the charge storage part MEM2_L 26. As a result, the charge storage parts MEM1_S 23 and MEM1_L 22 are empty, and thus the signal charges become to be able to be stored again in the next frame.

The signal reading out in the frame (N-th frame) in the first mode will be described with reference to FIG. 9.

Here, the signal charges stored in the MEM2_L 26 and the MEM2_S 27 in the frame ((N−1)-th frame) one frame before, are read out. Signal reading out processing for the n-th row, in the case of sequentially reading out for the rows will be described.

The timing control circuit 106 turns on SEL 17($n$), so as to read out a signal based on the charge of the FD 14 of the pixel of the n-th row. The timing control circuit 106 turns on the SEL 17($n$) and turns off the RES 15($n$) configured to reset the FD 14, and reads out the reset release level voltage VRES of the FD 14 (time t0). Next, the timing control circuit 106 turns on TX_L 28($n$), transfers the signal charge held in the MEM2_L 26 to the FD 14, and reads out the signal level VSIG of the FD 14 (time t1). |VSIG−VRES|, which is a difference between the two read-out signal levels, is a signal level proportional to a signal charge amount of the MEM2_L 26.

The timing control circuit 106 turns on the RES 15($n$) and further turns the RES 15($n$) off, to reset the FD 14, and reads out the reset release level voltage VRES of the FD 14 (time t2). Next, the timing control circuit 106 turns on TX_S 29($n$), transfers the signal charge held in the MEM2_S 27 to the FD 14, and reads out the signal level VSIG of the FD 14 (time t3). |VSIG−VRES|, which is a difference between the two read-out signal levels, is a signal level proportional to a signal charge amount of the MEM2_S 27. The timing control circuit 106 repeats this procedure in row order in all the regions or in the regions targeted for the acquirement, and acquires signals of the MEM2_L 26 and the MEM2_S 27, as the pixel signals.

As described above, the pixel 107 has, for one photoelectric conversion part PD1, two charge storage parts that store signal charges to be transferred, and has two charge storage parts that hold charges until the signal reading out of the next frame. Thus, it is possible to acquire a seamless moving image having no time domain in which an image cannot be acquired while having a high dynamic range.

On the other hand, for example, there is the possibility that the if the signal charges in the charge storage parts MEM2_L 26 and MEM2_S 27 are read out at the timing of transferring the charges to the charge storage parts MEM1_L 22 and MEM1_S 23, noise is added to the signal due to the influence of the current fluctuation or the like. In addition, in the first mode, since the charge is intermittently transferred to one charge storage part within one frame period, photographing sensitivity is lower than that in a case where the charge is not intermittently transferred.

Next, the driving related to the exposure in the second mode will be described with reference to FIG. 10. "Tlongi" in FIG. 10 indicates the storage time of the signal charge in a transfer performed once in the N-th frame. The transfer of the charge to the charge storage part MEM1_S 23 is performed in the first mode (FIG. 8); however, is not performed in the second mode.

After the charge storage in MEM1_L 22 is completed, the transfer of the charge to MEM2_L 26 is performed. It should be noted that the operation related to the reading out in the second mode is basically the same as that shown in FIG. 9. Since the charge is not stored in the MEM1_S 23 or the MEM2_S 27, operations of transferring and reading out the charges from the MEM1_S 23 or the MEM2_S 27 is not performed.

The driving mode switching processing is similar to that of the first embodiment and is as shown in FIG. 6. Therefore, in a case where the acquired exposure setting satisfies the predetermined condition, the control in the first mode is performed, and in a case where the acquired exposure setting does not satisfy the predetermined condition, the control in the second mode is performed.

According to the present embodiment, regarding suppression of the noise caused by the global shutter driving of the image pickup device 111, it is possible to achieve the similar effects to that in the first embodiment.

Figure 11:
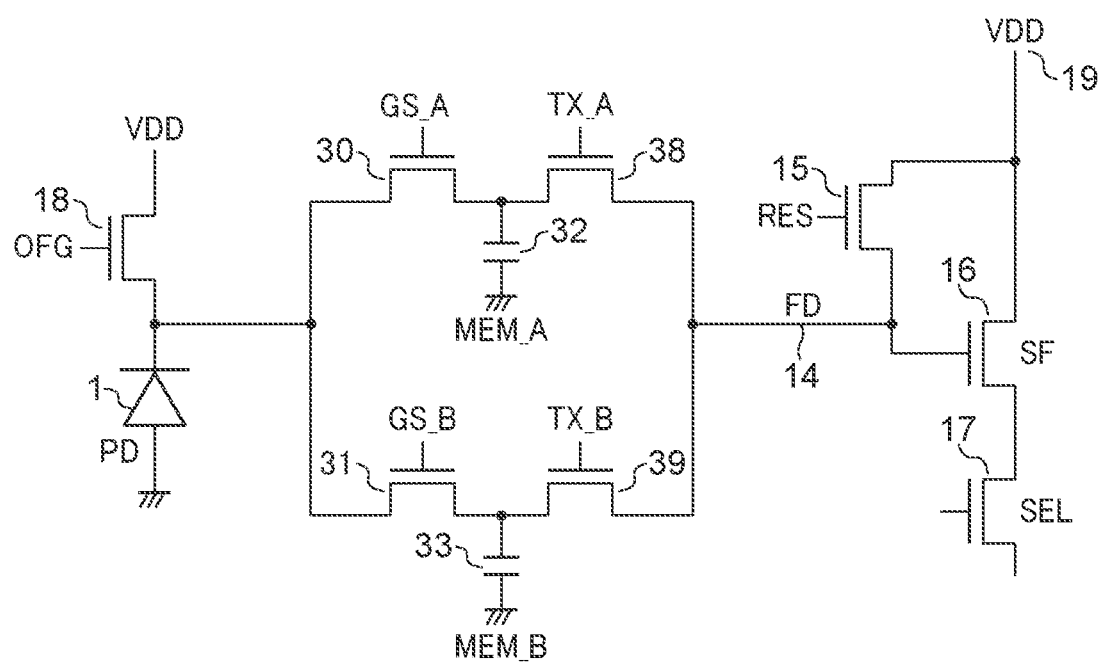
FIG. 11 is an equivalent circuit diagram of one pixel.

FIG. 11 is an equivalent circuit diagram of one pixel in the image pickup device 111 according to a third embodiment of the present invention. In the following description, the similar components to those of the first embodiment are denoted by the same reference numerals as those of the first embodiment, and a detailed description thereof will be omitted.

In the first embodiment, four charge storage parts are connected to the photoelectric conversion part PD1. In the third embodiment, two charge storage parts are connected to the photoelectric conversion part PD1, which is a difference from the first embodiment. The pixel 107 in the third embodiment corresponds to a pixel obtained by eliminating the charge transfer parts GS_SA 4 and GS_SB 5, the charge storage parts MEM_SA 8 and MEM_SB 9, and the transfer parts TX_SA 12 and TX_SB 13 from the pixel 107 in the first embodiment (FIG. 2).

A charge transfer part GS_A 30, a charge transfer part GS_B 31, a charge storage part MEM_A 32, and a charge storage part MEM_B 33 of the present embodiment are respectively configured similarly to the charge transfer part GS_LA 2, the charge transfer part GS_LB 3, the charge storage part MEM_LA 6, and the charge storage part MEM_LB 7 of the first embodiment (FIG. 2). Further, a transfer part TX_A 38 and a transfer part TX_B 39 of the present embodiment are respectively configured similarly to the transfer part TX_LA 10 and the transfer part TX_LB 11 of the first embodiment.

In the present embodiment, "a set of the MEM_A 32 and the MEM_B 33" corresponds to "at least two charge storage parts that store the charges transferred from the photoelectric conversion part". The MEM_A 32 and the MEM_B 33 are connected in parallel, in the subsequent stage of the photoelectric conversion part PD1.

Next, the method for driving the pixel part 101 in the present embodiment will be described with reference to FIGS. 12, 13, and 14.

Figure 12:
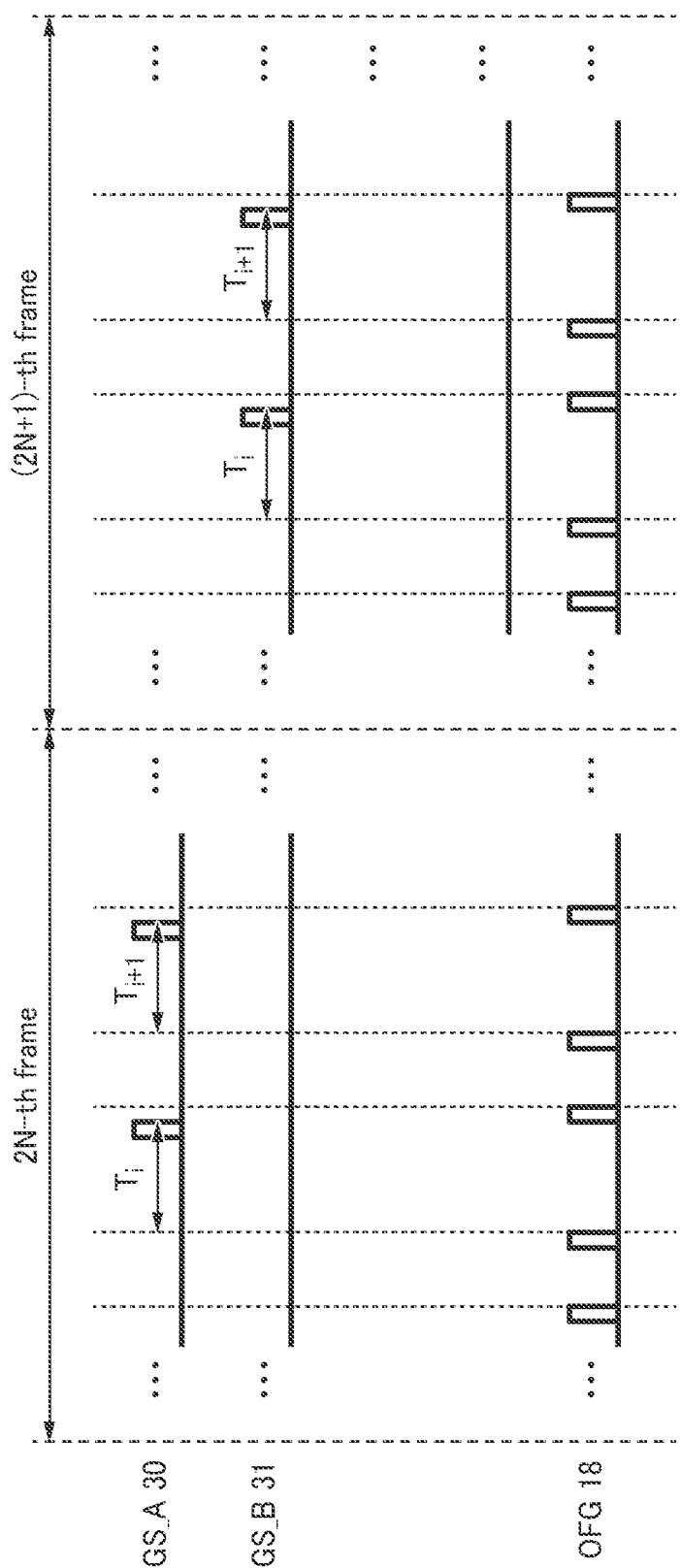
FIG. 12 is a timing chart of exposure driving in the first mode.
Figure 13:
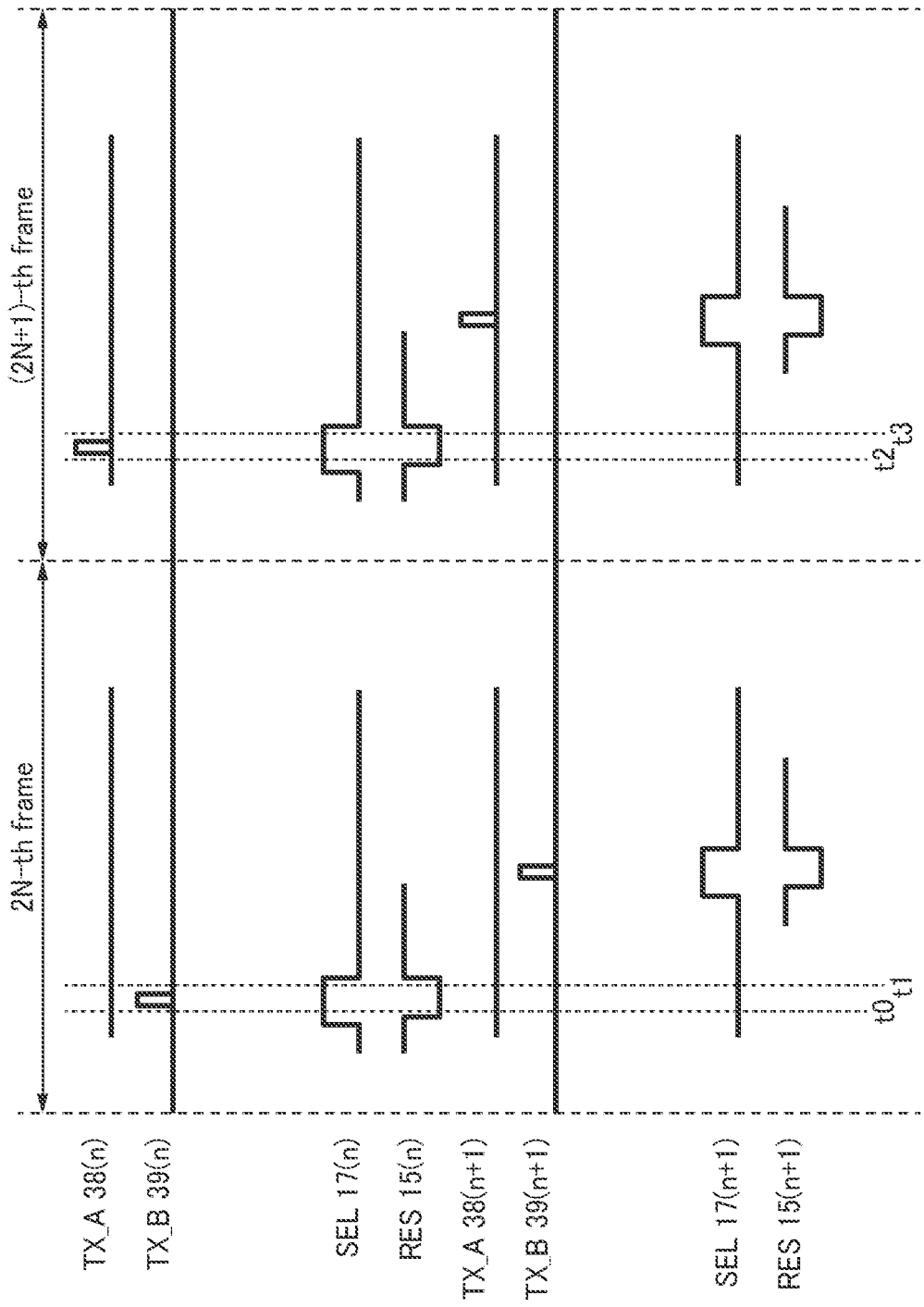
FIG. 13 is a timing chart of read-out driving in the first mode.
Figure 14:
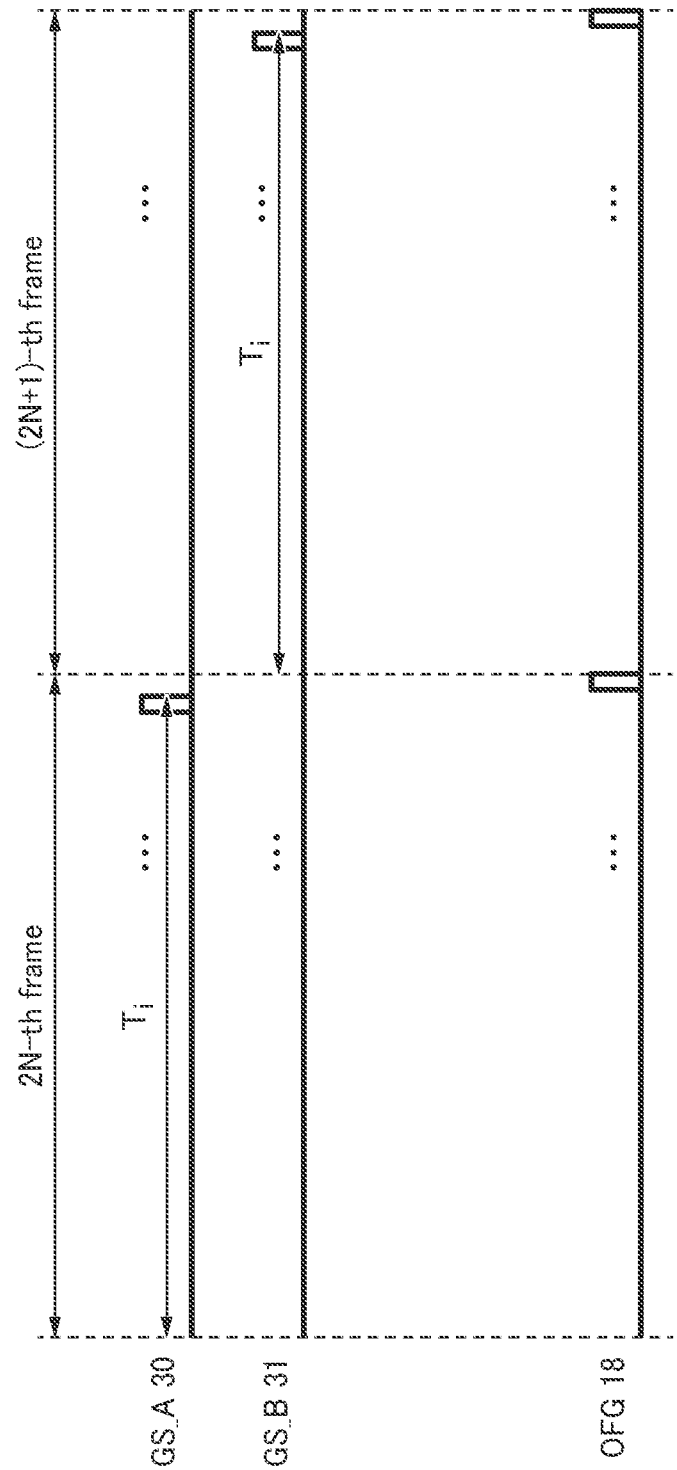
FIG. 14 is a timing chart of exposure driving in the second mode.

FIGS. 12 to 14 are timing charts showing the time series transition of the driving pulses supplied to the control electrodes and the transfer electrodes. In particular, FIGS. 12 and 14 show driving related to the exposure of one pixel, and FIG. 13 shows driving related to the signal reading out for a plurality of rows of the pixels. FIGS. 12 and 13 show driving in the first mode, and FIG. 14 shows driving in the second mode. Meaning of the suffix "n" is similar to that described in the first embodiment.

In the present embodiment, as shown in FIG. 12, in the first mode, only one charge storage part (the MEM_A 32 or the MEM_B 33) serves as a charge transfer destination from the photoelectric conversion part PD1 in one frame period, which is a difference from the first embodiment. As shown in FIG. 13, in the first mode, there is only one charge storage part (the MEM_A 32 or the MEM_B 33) from which the signal charges are read out in one frame period, which is a difference from the first embodiment. In the first mode, since the charge is intermittently transferred to one charge storage part within one frame period, the photographing sensitivity is lowered.

A driving operation related to the exposure in the second mode is as shown in FIG. 14. "Ti" shown in FIG. 14 is similar to "Tlongi" shown in FIG. 5. In the second mode, operations in the even-numbered frame and the odd-numbered frame are similar to those described with reference to FIG. 5.

The driving mode switching processing is similar to that of the first embodiment and is as shown in FIG. 6. Therefore, in a case where the acquired exposure setting satisfies the predetermined condition, the control in the first mode is performed, and in a case where the acquired exposure setting does not satisfy the predetermined condition, the control in the second mode is performed.

According to the present embodiment, regarding suppression of the noise caused by the global shutter driving of the image pickup device 111, it is possible to achieve the similar effects to that in the first embodiment.

Figure 15:
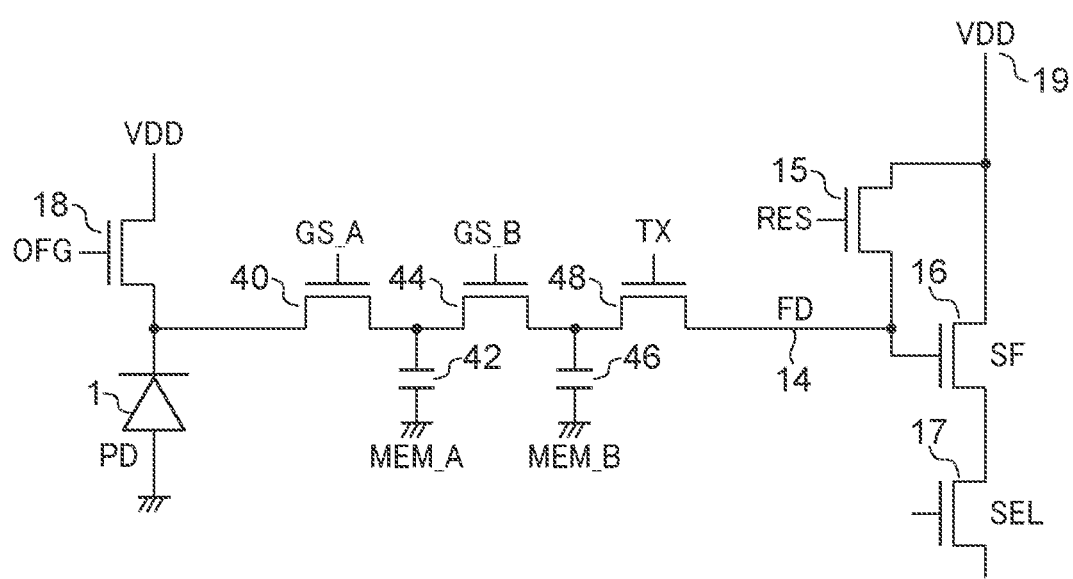
FIG. 15 is an equivalent circuit diagram of one pixel.

FIG. 15 is an equivalent circuit diagram of one pixel in the image pickup device 111 according to a fourth embodiment of the present invention. In the following description, the similar components to those of the second embodiment are denoted by the same reference numerals as those of the second embodiment, and a detailed description thereof will be omitted.

In the second embodiment, there are two sets of the "two charge storage parts connected in series" between the photoelectric conversion part PD1 and the FD 14. In the fourth embodiment, there is only one set of the "two charge storage parts connected in series" between the photoelectric conversion part PD1 and the FD 14. The pixel 107 in the fourth embodiment corresponds to a pixel obtained by eliminating the charge transfer parts GS1_S 21 and GS2_S 25, the charge storage parts MEM1_S 23 and MEM2_S 27, and the transfer part TX_S 29 from the pixel 107 in the second embodiment (FIG. 7).

A charge transfer part GS_A 40 and a charge transfer part GS_B 44 of the present embodiment are respectively configured similarly to the charge transfer part GS1_L 20 and the charge transfer part GS2_L 24 of the second embodiment (FIG. 7). Further, a charge storage part MEM_A 42, a charge storage part MEM_B 46, and a transfer part TX 48 of the present embodiment are respectively configured similarly to the charge storage part MEM1_L 22, the charge storage part MEM2_L 26, and the transfer part TX_L 28 of the second embodiment.

In the present embodiment, "a set of the MEM_A 42 and the MEM_B 46" corresponds to "at least two charge storage parts that store the charges transferred from the photoelectric conversion part". The MEM_A 42 and the MEM_B 46 are connected in series, in the subsequent stage of the photoelectric conversion part PD1.

Next, the method for driving the pixel part 101 in the present embodiment will be described with reference to FIGS. 16, 17, and 18.

Figure 16:
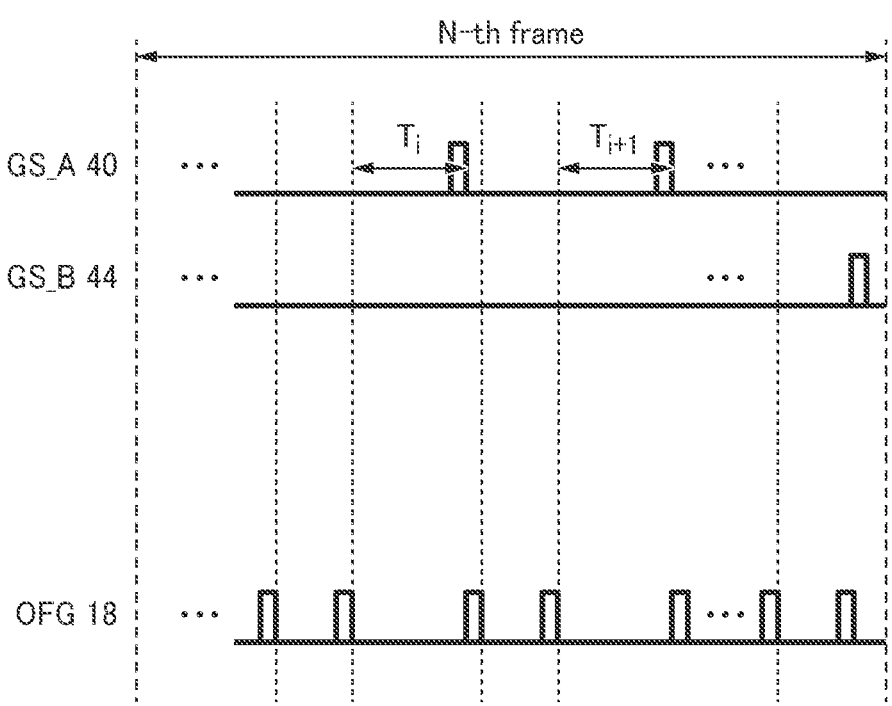
FIG. 16 is a timing chart of exposure driving in the first mode.
Figure 17:
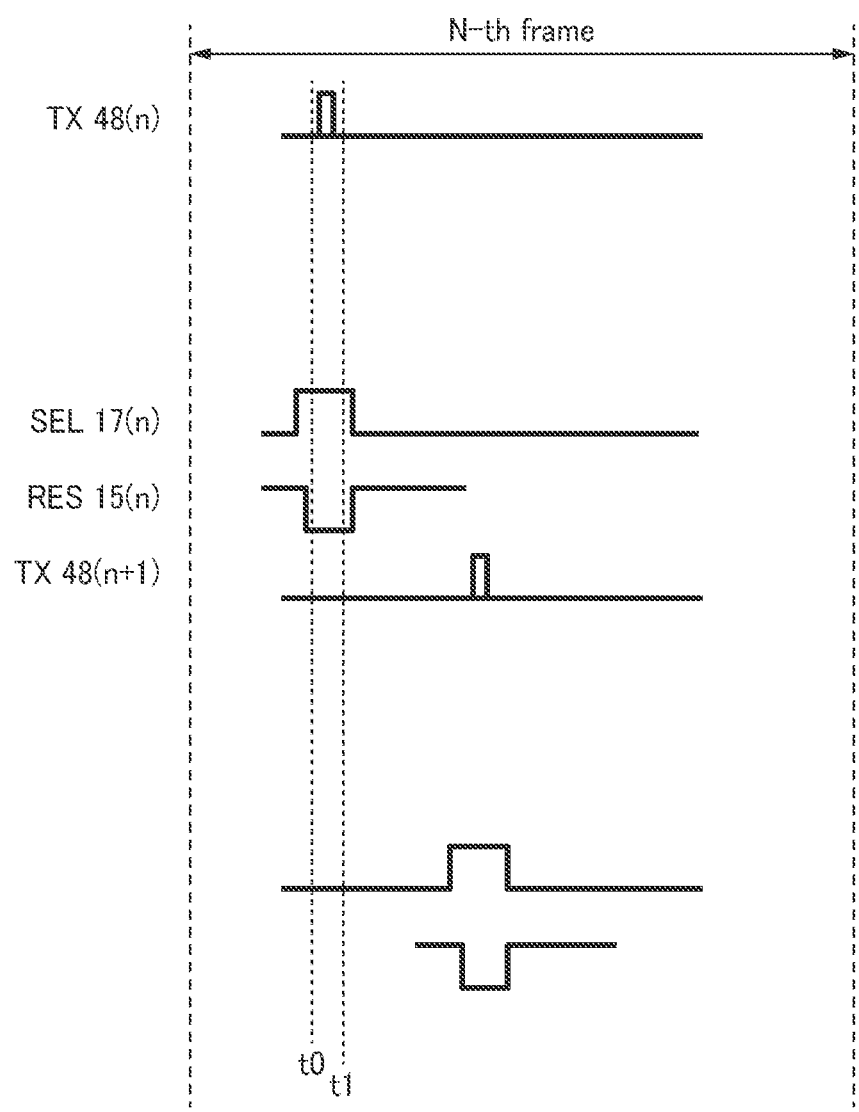
FIG. 17 is a timing chart of read-out driving in the first mode.
Figure 18:
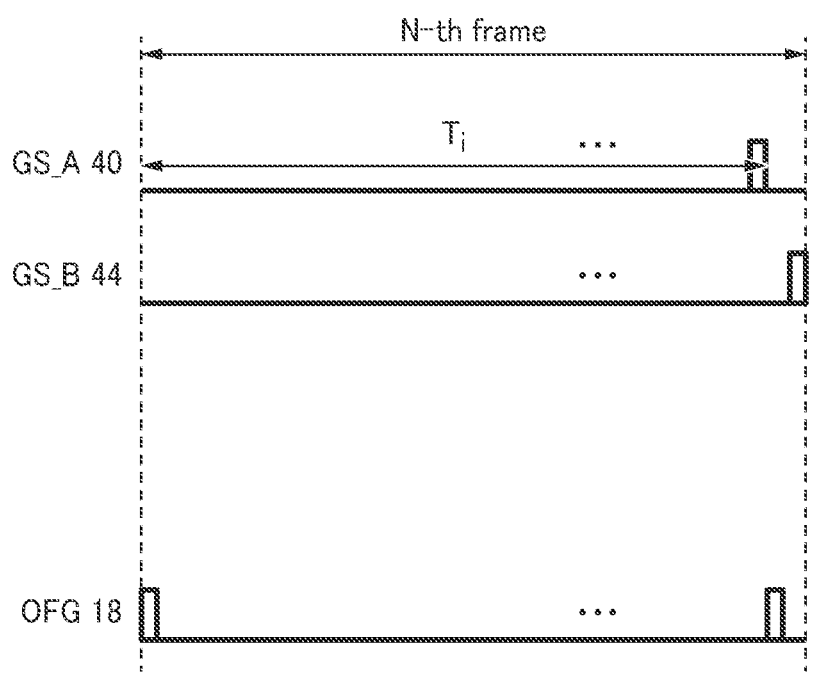
FIG. 18 is a timing chart of exposure driving in the second mode.

FIGS. 16 to 18 are timing charts showing the time series transition of the driving pulses supplied to the control electrodes and the transfer electrodes. In particular, FIGS. 16 and 18 show driving related to the exposure of one pixel, and FIG. 17 shows driving related to the signal reading out for a plurality of rows of the pixels. FIGS. 16 and 17 show driving in the first mode, and FIG. 18 shows driving in the second mode. Meaning of the suffix "n" is similar to that described in the first embodiment. In the present embodiment, driving method for only one frame is shown because there is no distinction in the driving method between the even-numbered frame and the odd-numbered frame.

In the first mode, the timing control circuit 106 controls so as to transfer the charges from the photoelectric conversion part PD1 to the charge storage part (MEM_A 42) in the preceding stage, in multiple transfers in one frame period. In the present embodiment, as shown in FIG. 16, only one charge storage part (the MEM_A 42) serves as the charge transfer destination from the photoelectric conversion part PD1 in one frame period. Further, as shown in FIG. 17, there is only one charge storage part (the MEM_B 46) from which the signal charges are read out in one frame period. Therefore, the charge stored in the charge storage part (MEM_A 42) in the previous stage is transferred to the charge storage part (MEM_B 46) in the subsequent stage, only once. In the first mode, since the charge is intermittently transferred to one charge storage part within one frame period, the photographing sensitivity is lowered.

The driving operation related to the exposure in the second mode is as shown in FIG. 18. "Ti" shown in FIG. 18 is similar to "Tlongi" shown in FIG. 10. In the second mode, the read operation is similar to that described with reference to FIG. 10.

The driving mode switching processing is similar to that of the first embodiment and is as shown in FIG. 6. Therefore, in a case where the acquired exposure setting satisfies the predetermined condition, the control in the first mode is performed, and in a case where the acquired exposure setting does not satisfy the predetermined condition, the control in the second mode is performed.

According to the present embodiment, regarding suppression of the noise caused by the global shutter driving of the image pickup device 111, it is possible to achieve the similar effects to that in the first embodiment.

It should be noted that in the first to fourth embodiments, the predetermined condition used in S102 described above is an example, and is not limited to the above-described condition. For example, the predetermined condition may be defined only by one of the ISO sensitivity and the gain. That is, the predetermined condition may be that "the ISO sensitivity is not higher than the first predetermined value".

Alternatively, the predetermined condition may be that "the value of the gain is not higher than the second predetermined value".

In a fifth embodiment of the present invention, a configuration in which the pixels of the image pickup device 111 respectively include filters having different sensitivities will be described. Although not shown, each pixel of the pixel part 101 includes color filters of Red, Green, and Blue. That is, color filters of a Bayer array are arranged in the plurality of pixels in the pixel part 101. In the case of such a configuration, optimum exposure setting differs depending on the pixels. Therefore, a value obtained by adding a gain value for performing white balance adjustment is used as the exposure setting (value) that is a basis for determining the pixel driving mode.

Figure 19:
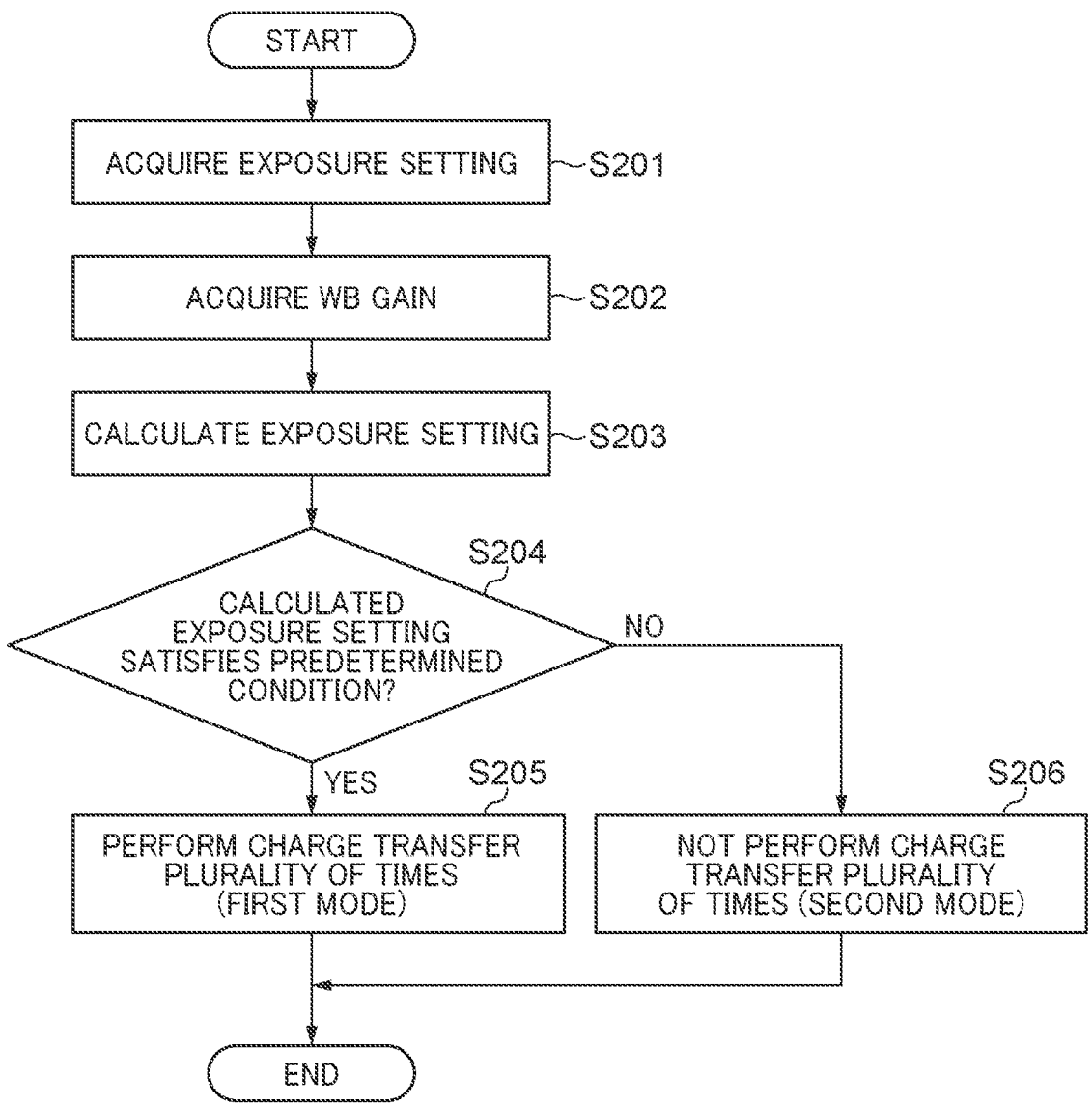
FIG. 19 is a flowchart showing the driving mode switching processing.

FIG. 19 is a flowchart showing the driving mode switching processing. An execution entity and starting conditions of this processing are similar to those of the driving mode switching processing of FIG. 6. This processing is performed on each pixel of Red, Green, and Blue.

In S201, the CPU of the image processing part 112 executes processing similar to that in S101 of FIG. 6. In S202, the CPU of the image processing part 112 acquires a white balance (WB) gain (WB setting) to be applied in the image pickup apparatus 1000. For example, in the driving mode switching processing for a pixel of Red, when a gain of twice is to be applied to the pixel of Red on the basis of a pixel of Green, a numerical value of "twice" is acquired. In S203, the CPU of the image processing part 112 calculates a total exposure setting for the focused pixel from the exposure setting acquired in S201 and the white balance gain acquired in S202. The exposure setting calculated in S203 is the value obtained by adding the gain value for performing the white balance adjustment.

In S204, the CPU of the image processing part 112 determines whether the exposure setting calculated in S203 satisfies a predetermined condition. The predetermined condition is that "the exposure setting calculated in S203 is equal to or less than a predetermined value". However, the predetermined condition is not limited thereto, and may be the same as that described in FIG. 6. In S205 and S206, the CPU of the image processing part 112 executes processing similar to those in S103 and S104.

According to the present embodiment, regarding suppression of the noise caused by the global shutter driving of the image pickup device 111, it is possible to achieve the similar effects to that in the first embodiment. In particular, even in a case where the filters of the Bayer array are arranged in the pixels in the pixel part 101, it is possible to suppress the noise caused by the global shutter driving of the image pickup device 111.

Although the present invention has been described in detail based on preferred embodiments thereof, the present invention is not limited to these embodiments, and various forms without departing from the gist of the present invention are also included in the present invention. Parts of the above-described embodiments may be appropriately combined.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium.

The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-017355, filed Feb. 8, 2023, which is hereby incorporated by reference wherein in its entirety.

What is claimed is:

1. An image pickup apparatus comprising:
   an image pickup device including a plurality of pixels each including a photoelectric conversion part that generates a charge by photoelectric conversion, and at least two charge storage parts that are connected to the photoelectric conversion part and store a charge transferred from the photoelectric conversion part; and
   a controller configured to perform control to switch a driving mode of the image pickup device between a first mode and a second mode according to exposure setting, wherein the driving mode includes the first mode in which the charge is transferred from the photoelectric conversion part to the charge storage part in multiple transfers in one frame period, and the second mode in which the charge is transferred from the photoelectric conversion part to the charge storage part only once in one frame period.

2. The image pickup apparatus according to claim 1, wherein
   the exposure setting includes setting of ISO sensitivity, and
   the controller controls the image pickup device to be driven in the first mode in a case where the ISO sensitivity is not higher than a predetermined value, and controls the image pickup device to be driven in the second mode in a case where the ISO sensitivity is higher than the predetermined value.

3. The image pickup apparatus according to claim 1, wherein
   the exposure setting includes setting of gain in signal processing, and
   the controller controls the image pickup device to be driven in the first mode in a case where a value of the gain is not higher than a predetermined value, and controls the image pickup device to be driven in the second mode in a case where the value of the gain is higher than the predetermined value.

4. The image pickup apparatus according to claim 1, wherein the at least two charge storage parts are connected to each other in parallel, in a subsequent stage of the photoelectric conversion part.

5. The image pickup apparatus according to claim 4, wherein in the first mode, the controller controls the image pickup device to transfer the charge from the photoelectric conversion part to charge storage parts at different timings from each other, in one frame period.

6. The image pickup apparatus according to claim 4, wherein in the first mode, the controller controls the image pickup device such that charge storage times in the charge storage parts in one frame period are different from each other.

7. The image pickup apparatus according to claim 1, wherein
   the at least two charge storage parts are connected to each other in series, in a subsequent stage of the photoelectric conversion part, and
   in the first mode, the controller controls the image pickup device so as to transfer the charge from the photoelectric conversion part to a charge storage part at a preceding stage among the at least two charge storage parts in multiple transfers in one frame period.

8. The image pickup apparatus according to claim 1, wherein
   color filters of a Bayer array are arranged in the plurality of pixels, and
   the exposure setting is a value obtained by adding a gain value for performing white balance adjustment.

9. The image pickup apparatus according to claim 1, wherein
   the controller is further configured to process a signal output from the image pickup device to generate an image.

10. The image pickup apparatus according to claim 9, wherein the controller generates one image by combining signals of the at least two charge storage parts of each pixel in the image pickup device.

* * * * *